UNITED STATES PATENT OFFICE.

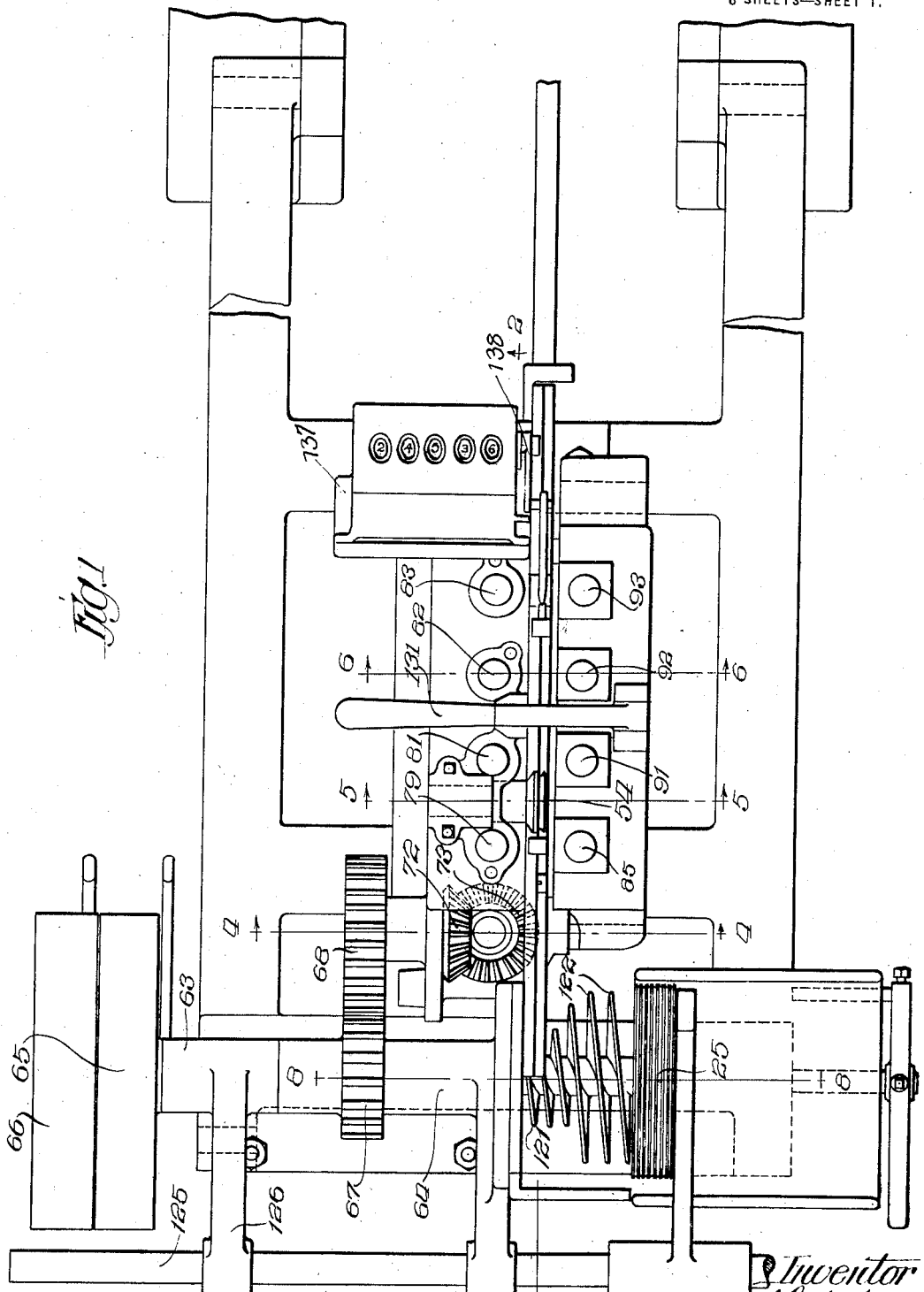

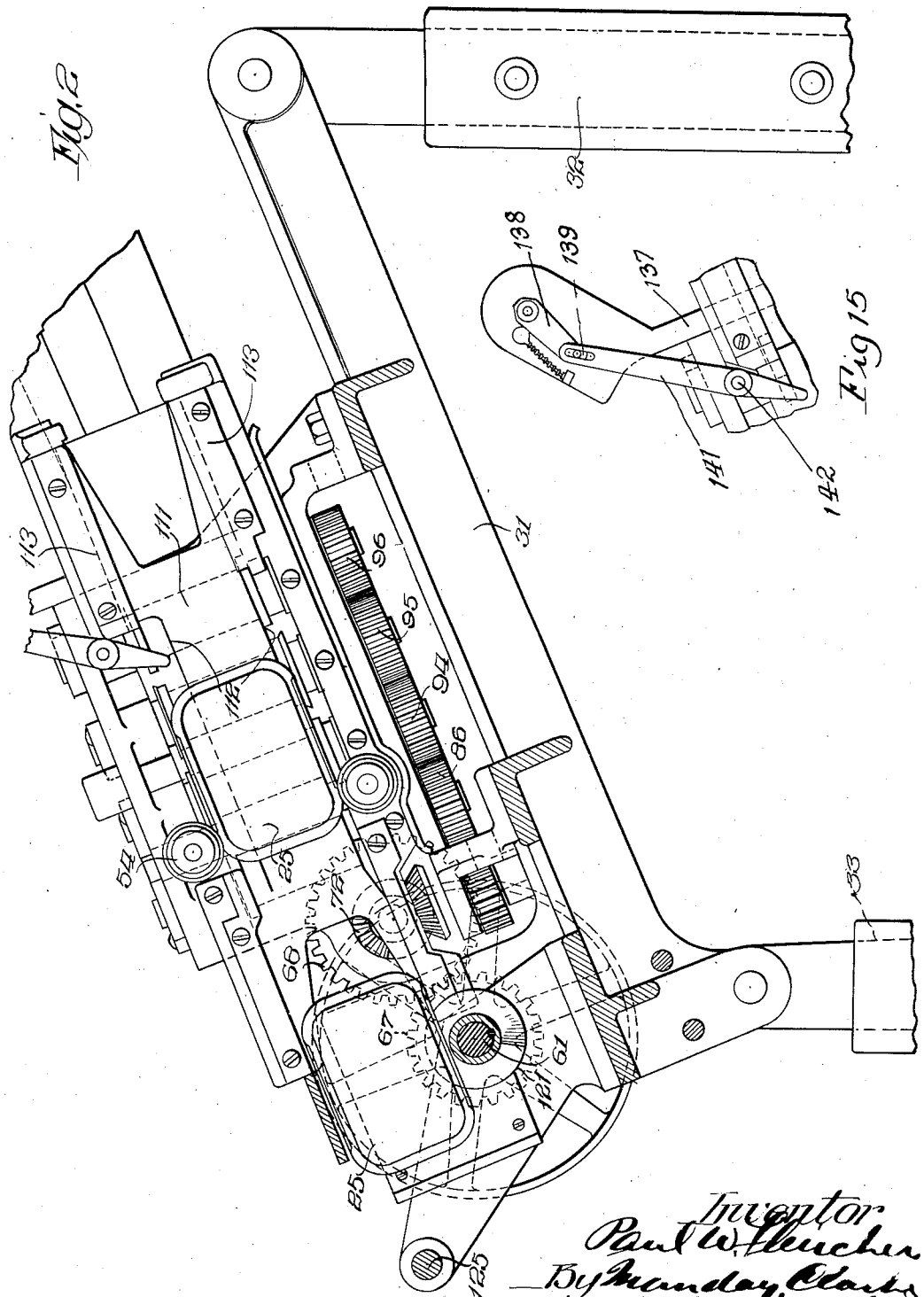

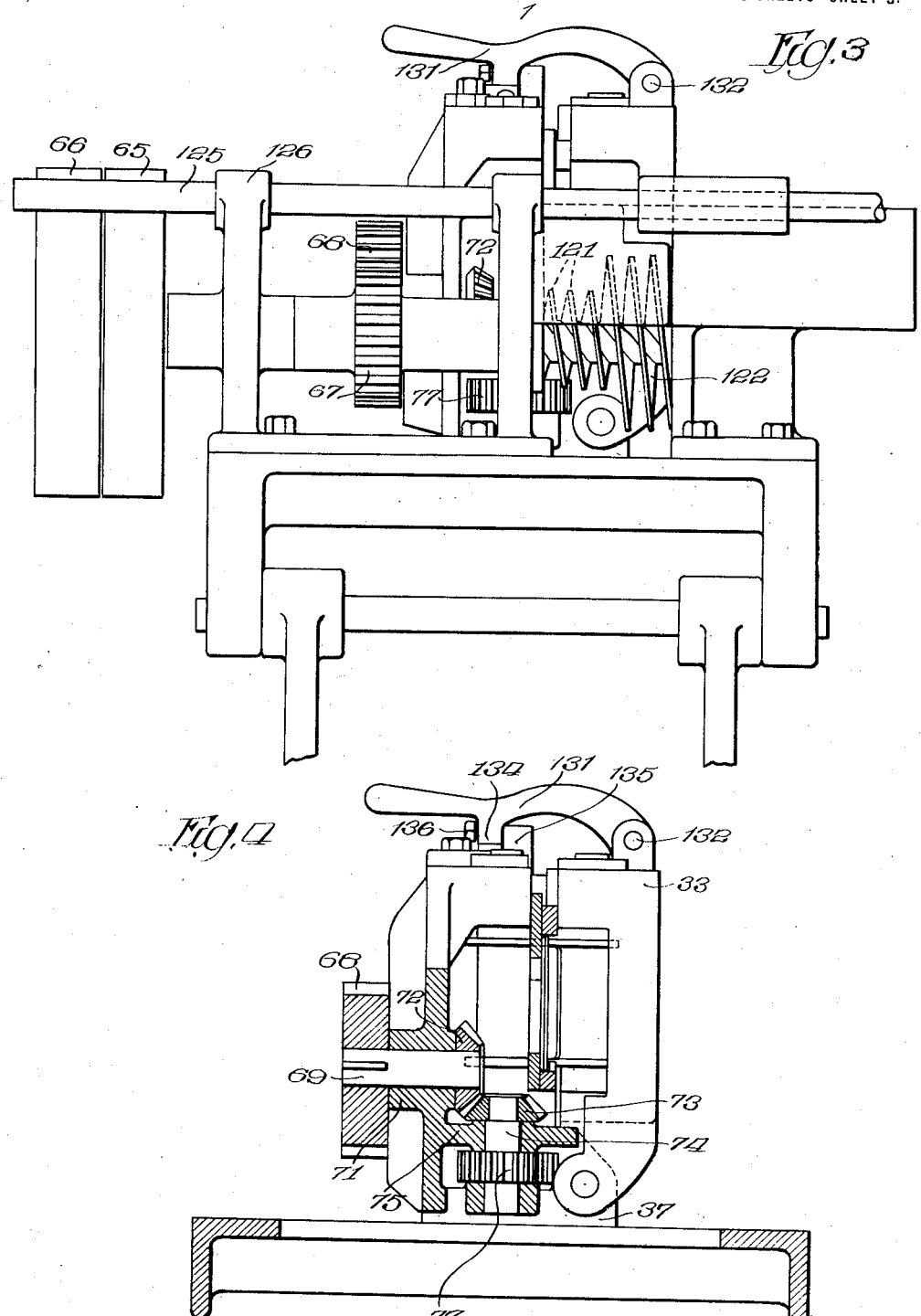

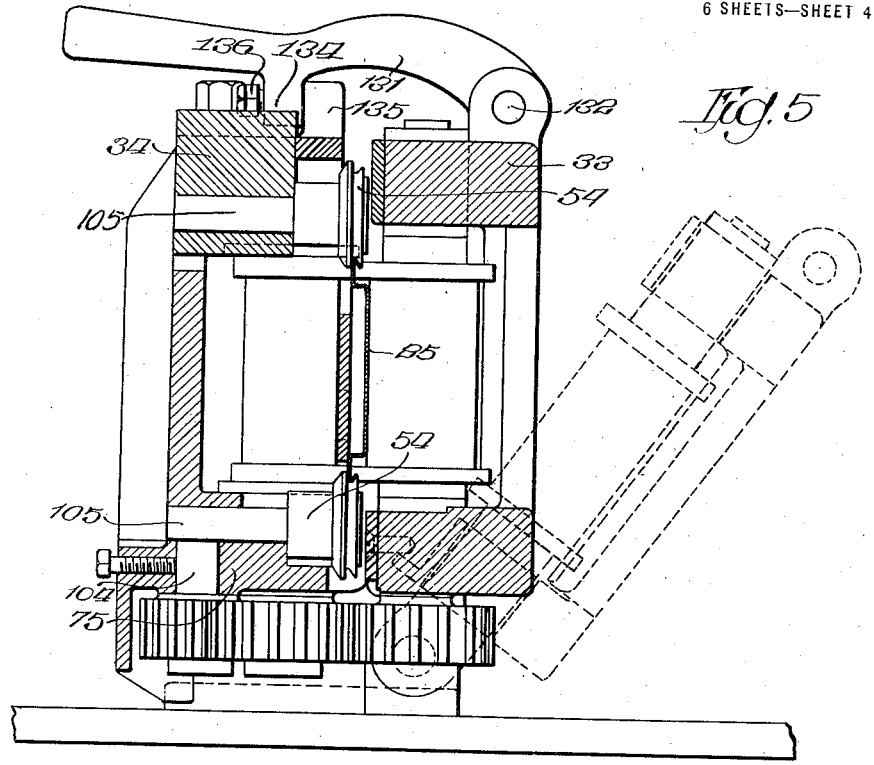
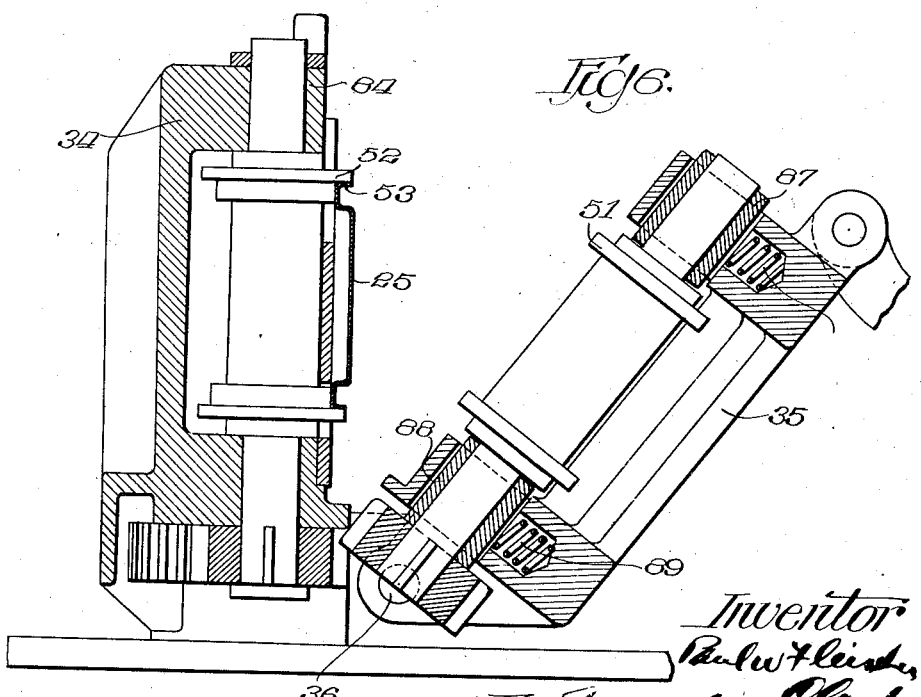

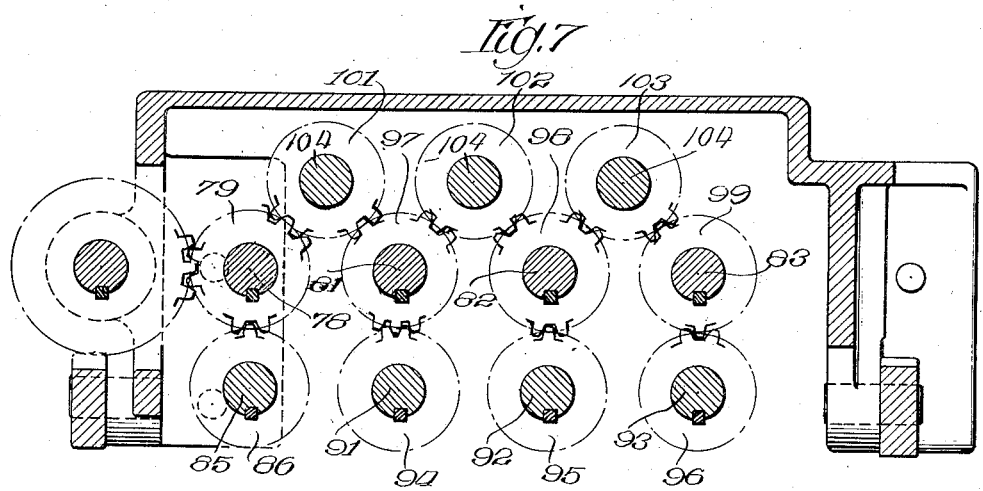
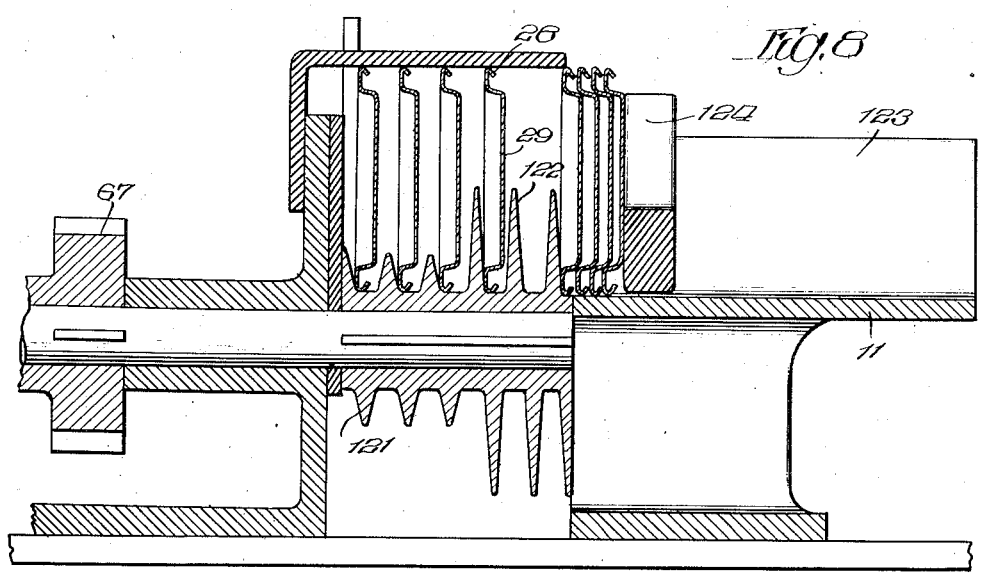
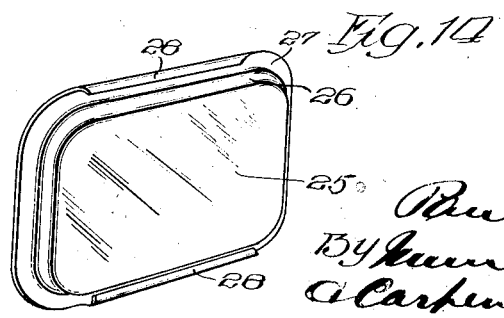

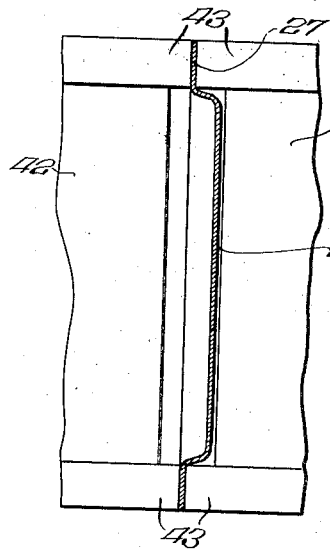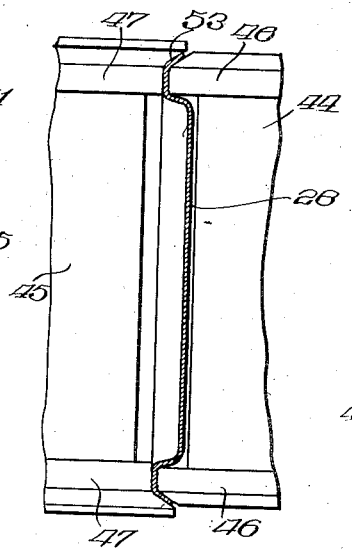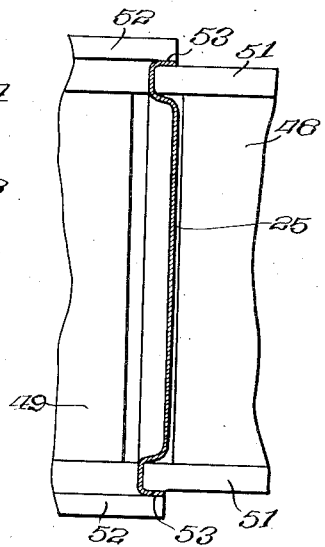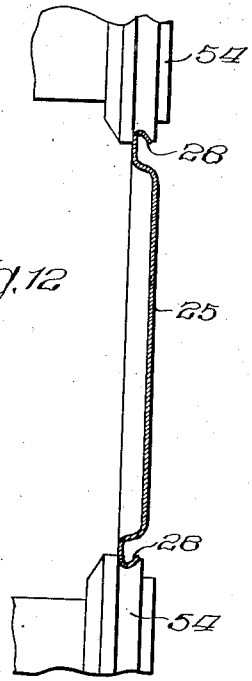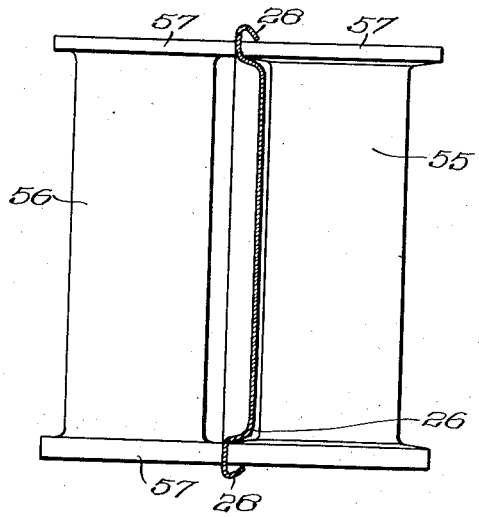

PAUL W. FLEISCHER, OF WEEHAWKEN HEIGHTS, NEW JERSEY, ASSIGNOR TO AMERICAN CAN COMPANY, OF NEW YORK, N. Y., A CORPORATION OF NEW JERSEY.

FLANGE-CURLING MACHINE.

1,389,639.   Specification of Letters Patent.   Patented Sept. 6, 1921.

Application filed June 30, 1919. Serial No. 307,663.

*To all whom it may concern:*

Be it known that I, PAUL W. FLEISCHER, a citizen of the United States, residing in Weehawken Heights, in the county of Hudson and State of New Jersey, have invented a new and useful Improvement in Flange-Curling Machines, of which the following is a specification.

This invention relates to machines for providing curls or bends on the flanges of can ends to prevent nesting of the same and attain other valuable results, and has for its object the provision of a machine which will provide can ends for use in connection with a flanged can body, and having spacing curls on the edges of the flanges, said curls being accurately formed and gaged to insure facility of assembling the flanged ends on said flanged bodies, preliminary to the formation of the seams.

The invention has for an object also the provision of a completely automatic machine for progressively curling the flanges of rectangular or polygonal shaped ends, and has for an object also the provision of a machine of this character of strong durable and simple parts unlikely to require repair or replacement, and capable of operation without requiring special training or direction of the attendants. Another important object of the invention is the provision of such a machine which will permit of the easy removal of can ends being operated upon should they become jammed in the machine from any cause.

Numerous other objects and advantages of the invention will be apparent as the invention is better understood from the following description, which when taken in connection with the accompanying drawings illustrates a preferred embodiment thereof.

Referring to the drawings,

Figure 1 is a top plan view of an apparatus embodying my present invention;

Fig. 2 is a section taken substantially on a line 2—2 of Fig. 1;

Fig. 3 is an end view of the same, a part of the base being broken away;

Fig. 4 is a section taken on the line 4—4 of Fig. 1;

Fig. 5 is an enlarged section taken on the line 5—5 of Fig. 1;

Fig. 6 is a similar view with the parts differently arranged and taken on the line 6—6 of Fig. 1;

Fig. 7 is a section taken through the gear box;

Fig. 8 is a section taken on the line 8—8 of Fig. 1;

Figs. 9–13 are enlarged details showing the progressive feeding of the can end, formation of the curls, and gaging of the curls and spaces between the edges of the curls and the shoulders of the can ends;

Fig. 14 is a perspective view of a can end after it has passed through the apparatus; and Fig. 15 is partial view showing a part of a counting mechanism.

The machine shown on the drawing is adapted to operate upon the usual rectangular sardine can end or closure of commerce and it is intended that the machine will form upon the opposite longer sides a curl at the flange edge. This will, perhaps, be best understood by viewing Fig. 14, on which reference character 25 indicates the can end, reference character 26 the usual shoulder, and reference character 27 the usual flange. At the edge of the flange and along the longer sides the material is drawn or bent over into curls 28, as will be clearly apparent upon comparing this figure with Fig. 8 upon the same sheet of drawing.

The apparatus shown on the drawing and of which mention has already been made, will now be described:

A bed 31 is rigidly supported and preferably in inclined position, upon legs 32 at the feed end and legs 33 at the delivery end, which legs may, of course, be individual supports or constitute parts of the machine frame. Mounted upon this bed and extending longitudinally of it is a roll housing 34, to which or to the bed is pivoted a companion roll housing 35 at 36, the pivots 36 in the present instance, being shown as indicated in Figs. 3 and 4 as engaged in lugs 37. These housings carry a plurality of sets of rolls for operating upon the can ends in the manner indicated in Figs. 9 to 13.

A can end entering into the operative portion of the machine is engaged first by two rolls 41 and 42 which are merely feeding rolls in the present instance. These rolls have parts 43 of diameter larger than the bodies and are adapted to engage the side flanges 27 of the can end 25 to feed it forward. The can end next encounters a set of rolls 44 and 45 which provide the initial bend in the extremities of the side flanges and these rolls have ends 46 and 47 which provide a bending pass between them to bring the edges of the flange to the angular formation shown in Fig. 10. That is to say, the set of rolls 44 and 45 bend the edges of the flanges to approximately 45 degrees from the plane of the flanges themselves. Leaving the rolls 44 and 45 the can end enters between rolls 48 and 49 and these rolls have ends 51 and 52, defining between them passes of right angle form, so that the part 53 which was bent to the angular position shown in Fig. 10 is by these rolls bent to that shown in Fig. 11. From the rolls 48 and 49, the can end passes curling rolls 54 which curl over the bent up parts 53 of the flanges into the curls 28. From the rolls 54 the can end passes between gaging rolls 55 and 56, having ends 57, one of which rolls, *i. e.* that to the left viewing Fig. 13 is disposed behind the flange, and that to the right in position to cause the ends 57 to enter in between the edges of the curls 28 and the shoulders 26 of the can ends to gage the curl and the space between the edge of the curl and the shoulder in order that these spaces may be sufficient to permit the can ends to be assembled readily upon the can bodies and without special fitting. The rolls 55 and 56 act as feeding rolls also and, indeed, this is true of the rolls 44, 45, 48, 49.

The rolls which operate upon one side of the can end, *i. e.* the rolls which are located at one side of the travel of the can end through the machine, are mounted in one of the housings already mentioned and the rolls that operate upon the other side are mounted in the other housing, so that when the housings are separated any can end that may have become distorted or jammed in the apparatus can be easily removed.

All of the rolls except the rolls 54 in the present instance are positively driven and from a common power source. A power shaft 61 (Fig. 2) is mounted in bearings 63, 64 and upon this shaft are fast and loose pulleys 65 and 66 driven from any suitable source of power. The shaft 61 carries a pinion or gear 67 which meshes with a gear 68 upon a stub shaft 69 having bearing at 71 in the fixed housing 34, and carrying a beveled pinion 72 within the housing. This pinion is in mesh with a companion pinion 73 fixed on a stub shaft 74 having bearing in a partition 75 which forms the upper wall of the gear case. The stub shaft 74 carries a gear 77 which meshes with a gear 79 upon a shaft extension 78 of roll 56, the gear 79 being located beneath the wall 75. The rolls 56 and indeed the rolls 42, 45 and 49 also, are provided with similar shaft extensions indicated respectively at 81, 82 and 83 and similarly positioned through the wall 75. The upper ends of all these rolls have bearing in the top wall 84 of the housing 34, an example of which is shown in Fig. 6.

The roll 55 is mounted in the housing 35 and has a shaft extension 85 upon which is a gear 86 meshing with the gear 79, so that both of these rolls are positively driven and in opposite directions. The rolls 41, 44, 48 and 55 are all similarly mounted in the housing 35 and in bearings 87, 88, respectively at the top and bottom of the housing. These bearings are spring pressed by springs 89 to cause the rolls to be firmly, but yieldingly held in contact with their companion against the flanges in the several operations. The gear connections 78 and 86 is duplicated as may be seen from viewing Fig. 7 for the four sets of rolls, 41—42, 44—45, 48—49, and 55—56. Shaft extensions 91, 92 and 93 respectively upon rolls 48, 44, 41 carry gears 94, 95 and 96, meshing with companion gears 97, 98 and 99 upon shaft extensions, 81, 82, and 83. The gears 79, 97, 98 and 99 are interconnected by gears 101, 102 and 103 which are idlers and are mounted upon stud shafts 104, thus completing the chain of gearing for driving these several sets of rolls. No driving mechanism is provided in the present instance for driving the rolls 54 which impart the curl, these rolls being merely mounted upon horizontally disposed stub shafts 105 in the fixed housing 34, the operative portions of the rolls 54 being located above and beneath the travel of the can end as indicated in Fig. 5.

The can ends, of course, may be fed in between the rolls in any suitable fashion. However, I have shown on the drawing a guiding device comprising a backing plate 111 which extends past all of the rolls and is cut away at its top and bottom at 112 to permit access of the rolls to the can end. Plates 113 are provided at the forward end of this plate to form the other side of the guide and to direct the can ends accurately in between the rolls. At the delivery end the can ends are projected on to the bed in vertical position and above the shaft 61, which at this point is provided with a feeding spiral of two dimensions, that is to say, there is a worm or spiral 121 on the shaft, extending from adjacent the can end receiving point to a substantial distance at one side thereof and a second spiral 122 which forms a continuation of the first, but which is of materially larger diameter and brings the can ends to nearly upright position as they are fed forwardly by reason of the spiral rotation. The can ends after they leave the spirals pass into a constantly enlarging receiving and stacking pocket formed by the bed 11 at the bottom, upwardly extending side walls 123 at the sides and a moving arm 124 at the front. This arm is mounted upon a rod 125, carried in brackets 126, from bearings 63 and 64 and is adapted to be moved ahead as the can ends are assembled and as may be seen by comparing Figs. 1 and 8.

Locking means are provided to hold the housings in operative relation and these locking means in the present instance comprise one or more levers 131, pivoted at 132 on the housing 35 and having a lug 134 adapted to engage behind a companion lug 135 on the housing 34. If desired, a tightening screw 136 may also be provided.

If desired, a counting mechanism may be provided as may be seen by comparing Figs. 2 and 15. Upon a mounting 137 secured to the front end of housing 34, may be positioned a counting mechanism having a reciprocating crank 138, and engaged by pin and slot connection 139, with a lever 141 pivoted at 142 on the housing 34, and extending down between the rolls 42 and 45, and at one side of these rolls into the path of travel of the can ends.

By reference to Fig. 2 of the drawings it will be noted that this machine is mounted in an inclined position. This is done to facilitate attachment to an ordinary stamping press which is usually also mounted in an inclined position and to enable conveying or guiding the covers as formed by the stamping press directly into the chute conveying the covers into the curling machine. This renders the operation entirely automatic from the act of stamping the covers to their being placed into a stack for other use. This also permits of feeding the covers from the press to the curling machine by means of gravity chutes which are, at times, preferable and are cheaper to operate than moving conveyers.

It is thought that the invention and many of its attendant advantages will be understood from the foregoing without further description, and it will be obvious that various changes may be made in the form, construction and arrangement of the parts without departing from the spirit and scope of the invention or sacrificing all of its material advantages, the form hereinbefore described being merely a preferred embodiment thereof.

I claim:

1. A can end flanging machine for curling the flanges of rectangular can ends, comprising in combination a plurality of sets of rolls successively engaging the flanges to be curled and operating to bring said flanges to desired formation, housings in which said rolls are mounted and between which the can ends move while being operated upon, said housings being separable on an axis parallel to the direction of travel of the said can ends.

2. A can end flanging machine for curling the flanges of rectangular can ends, comprising in combination a plurality of sets of rolls successively engaging the flanges to be curled and operating to bring said flanges to desired formation, separate housings for said rolls, one of said housings being movable with respect to the other on an axis parallel to the direction of travel of the said can ends.

3. A can end flanging machine for curling the flanges of rectangular can ends, comprising in combination a plurality of sets of rolls successively engaging the flanges to be curled and operating to bring said flanges to desired formation, separate housings for said rolls, one of said housings being movable with respect to the other on an axis parallel to the direction of travel of the said can ends, and means for locking said housings together and in operative relation.

4. A can end flanging machine for curling the flanges of rectangular can ends, comprising in combination a plurality of sets of rolls successively engaging the flanges to be curled and operating to bring said flanges to desired formation, pivotally connected housings in which said rolls are mounted, and between which the can ends move while being operated upon, said housing being separable about said pivotal connection on an axis parallel to the direction of travel of the said can ends.

5. A can end flanging machine for curling the flanges of rectangular can ends, comprising in combination a plurality of sets of rolls successively engaging the flanges to be curled and operating to bring said flanges to desired formation, said rolls being arranged at the sides of the path of the can ends and holding the latter in upright position, and a support for the bottom edge of the can end whereby the same is gaged relative to the operating portion of the rolls, and power mechanism for rotating said rolls.

6. A can end flanging machine for curling the flanges of rectangular can ends, comprising in combination a plurality of sets of rolls successively engaging the flanges to be curled and operating to bring said flanges to desired formation, and power mechanism for rotating said rolls, and housings in which said rolls are mounted, one of said housings being pivoted to swing on an axis parallel to the direction of travel of the said can ends to separate certain of said rolls.

7. A can end flanging machine for curling the flanges of rectangular can ends, comprising in combination a plurality of sets of rolls successively engaging the flanges to be curled and operating to bring said flanges to desired formation, said rolls being driven by inter-engaging mechanism and certain of said rolls being mounted to swing on an axis parallel to the direction of travel of said can ends, to disengage said mechanism.

8. A can end flanging machine for curling the flanges of rectangular can ends, comprising in combination a plurality of sets of rolls successively engaging the flanges to be curled and operating to bring said flanges to desired formation, gear connections between said rolls, and including idler gears, and separable housings in one of which certain of said rolls and said idlers are mounted, and in another of which other said rolls are mounted, one of said housings being pivoted to swing on an axis parallel to the direction of travel of said can ends.

9. A can end flanging machine for curling of flanges of rectangular can ends comprising a plurality of sets of rolls for feeding and curling the flanges, rolls for gaging the space between the curl and the shoulder of the can, and means for removing the curled can ends laterally and on their bottom edges.

10. A can end flanging machine for curling the flanges of cans comprising rolls for curling said flanges and rolls for gaging the curl formed by said first mentioned rolls, said curling rolls and said gaging rolls being mounted on axes perpendicular to each other, and means for removing the curled can ends laterally and on their bottom edges.

11. A can end flanging machine for curling the flanges of rectangular can ends comprising in combination: a first set of rolls for feeding flanged can ends, said rolls rotating on upwardly and downwardly extending axes and having at their upper and lower ends cylindrical faces which grasp the flanges of the can ends on opposite sides; a second set of rolls having at their upper and lower ends conical faces adapted to provide an initial bend in the extremities of said flanges; a third set of rolls having flat end faces adapted to complete a right angle bend in the extremities of said flanges; a fourth set of rolls mounted on horizontal axes and having concave faces adapted to curl over the bent portions of said flanges; and a fifth set of rolls having cylindrical faces and flat end faces engaging the space between the edge of the curl and the shoulder of said can ends, all of said sets of rolls being arranged at the sides of the path of the can ends and holding the latter in upright position, and means whereby the bottom edge of the can ends is gaged relative to the operating portion of said sets of rolls.

12. A can end flanging machine for curling the flanges of rectangular can ends comprising in combination: a first set of rolls for feeding flanged can ends, said rolls rotating on upwardly and downwardly extending axes and having at their upper and lower ends cylindrical faces which grasp the flanges of the can ends on opposite sides; a second set of rolls having at their upper and lower ends conical faces adapted to provide an initial bend in the extremities of said flanges; a third set of rolls having flat end faces adapted to complete a right angle bend in the extremities of said flanges; a fourth set of rolls mounted on horizontal axes and having concave faces adapted to curl over the bent portions of said flanges; and a fifth set of rolls having cylindrical faces and flat end faces engaging the space between the edge of the curl and the shoulder of said can ends, all of said sets of rolls being arranged at the sides of the path of the can ends and holding the latter in upright position, a support for the bottom edge of the can ends whereby the same is gaged relative to the operating portion of said sets of rolls, and a housing for said rolls constructed in two parts pivotally connected on a longitudinal axis.

13. A can end flanging machine for curling the flanges of rectangular can ends comprising in combination: a first set of rolls for feeding flanged can ends, said rolls rotating on upwardly and downwardly extending axes and having at their upper and lower ends cylindrical faces which grasp the flanges of the can ends on opposite sides; a second set of rolls having at their upper and lower ends conical faces adapted to provide an initial bend in the extremities of said flanges; a third set of rolls having flat end faces adapted to complete a right angle bend in the extremities of said flanges; a fourth set of rolls mounted on horizontal axes and having concave faces adapted to curl over the bent portions of said flanges; and a fifth set of rolls having cylindrical faces and flat end faces engaging the space between the edge of the curl and the shoulder of said can ends, all of said sets of rolls being arranged at the sides of the path of the can ends and holding the latter in upright position, and a support for the bottom edge of the can ends whereby the same is gaged relative to the operating portion of said sets of rolls.

PAUL W. FLEISCHER.